(12) United States Patent  
Ikeda

(10) Patent No.: US 6,324,958 B1  
(45) Date of Patent: Dec. 4, 2001

(54) AUTOMATIC BRAKE BOOSTER

(75) Inventor: Masahiro Ikeda, Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/346,780

(22) Filed: Jul. 7, 1999

(30) Foreign Application Priority Data

Aug. 7, 1998 (JP) ................................................ 10-224514

(51) Int. Cl.$^7$ ....................................................... F15B 9/10
(52) U.S. Cl. ........................................................ 91/376 R
(58) Field of Search ............................................ 91/376 R

(56) References Cited

U.S. PATENT DOCUMENTS

| | | | |
|---|---|---|---|
| 4,667,568 | * 5/1987 | Morimoto | 91/376 R |
| 5,651,300 | 7/1997 | Ikeda et al. | |
| 5,857,399 | * 1/1999 | Tsubouchi et al. | 91/369.1 |
| 5,907,990 | 6/1999 | Satoh | |

FOREIGN PATENT DOCUMENTS

| | | |
|---|---|---|
| 9-2243 | 1/1997 | (JP) . |
| 9-2243-A | * 1/1997 | (JP) . |

\* cited by examiner

Primary Examiner—Edward K. Look  
Assistant Examiner—Michael Leslie  
(74) Attorney, Agent, or Firm—Flynn, Thiel, Boutell & Tanis, P.C.

(57) ABSTRACT

A valve mechanism comprises a first valve seat formed on a valve body and facing rearward, a second valve seat formed on a sleeve which is urged rearward of a spring and facing rearward, and a valve element urged by a popped return spring to be seated upon either valve seat. An effective diameter D1 of a rolling part of the valve element, an effective diameter D2 of a seal member and an effective diameter D3 of the second valve seat are chosen to be equal to each other. This arrangement allows a differential pressure which urges the sleeve and the valve element forward in the inoperative condition of the brake booster to be cancelled out, thereby allowing a load to which an urging spring must be charged to be reduced and thus allowing the use of a solenoid which is reduced in size, weight and heating value and hence which is inexpensive.

8 Claims, 5 Drawing Sheets

AUTOMATIC BRAKE BOOSTER

FIELD OF THE INVENTION

The invention relates to an automatic brake booster as used in a brake of an automobile or the like, and more particularly, to an improvement of a valve mechanism thereof.

DESCRIPTION OF THE PRIOR ART

An automatic brake booster is known in the art including a valve body slidably disposed within a shell, a power piston mounted on the valve body, a constant and a variable pressure chamber defined across the power piston and a valve mechanism disposed within the valve body for switchingly controlling a flow path therein; the valve mechanism comprising a first valve seat formed on the valve body and facing rearward, a sleeve slidably fitted into the valve body and urged rearward by a spring, a second valve seat formed on the sleeve and facing rearward, a valve element urged forward by a poppet return spring to be seated on the first and the second valve seat, drive means for displacing the sleeve forward to switch the flow path, a valve plunger sidably disposed in the sleeve and coupled to an input shaft for driving the sleeve forward as the input shaft is driven forward to switch the flow path, and a seal member interposed between the sleeve and the valve plunger to maintain a hermetic seal between the members; the valve element comprising a rolling part located at a rear portion thereof and which is folded radially outward to be connected to the valve body, and a first and a second seat area disposed forwardly of the rolling part and which are adapted to be seated on the first and the second valve seat, respectively (see Japanese Laid-Open Patent Application No. 2243 of 1997).

In a conventional automatic brake booster as mentioned above, the drive means generally comprises a solenoid. However, in the disclosed valve mechanism, the effective diameter of the second valve seat (atmosphere valve seat) is chosen to be larger than the effective diameter of the seal member and the effective diameter of the rolling part of the valve element is chosen to be larger than the effective diameter of the second valve seat, whereby in the inoperative condition of the booster where the valve element is seated on the second valve seat and is removed from the first valve seat, the differential pressure acting upon the sleeve causes the latter to be urged forwardly, and the valve element itself, which is seated on the second valve seat formed on the sleeve, is urged forwardly due to the differential pressure thereacross. This required that a load to which the spring urging the sleeve rearward is charged or preset be chosen high in consideration of the differential pressure across the sleeve, the differential pressure across the valve element and the force exerted by the poppet return spring which urges the valve element forward. To displace the sleeve forward against the resilience of the spring, it has been necessary that the solenoid could supply a magnetic force of an increased magnitude. This in turn requires a solenoid of an increased size and an increased weight, involves a high heating value, and results in an increased cost, all of which are disadvantageous.

SUMMARY OF THE INVENTION

In view of the foregoing, the invention provides a valve mechanism for an automatic brake booster which allows the use of a solenoid of a reduced magnetic force as compared with the prior art.

Specifically, according to a first aspect of the invention, there is provided an automatic brake booster of the same type as mentioned above, but in which the effective diameter of the rolling part of the valve element is chosen to be equal to the effective diameter of the seal member and the effective diameter of the second valve seat is chosen to be equal to or less than the initially mentioned effective diameter.

According to the first aspect of the invention, in the inoperative condition of the booster where the valve element is seated on the second valve seat formed on the sleeve and is removed from the first valve seat formed on the valve body, the differential pressure which urges the sleeve and the valve element forward is cancelled out by a differential pressure of an equivalent magnitude which urges them rearward. Thus the sleeve and the valve element are no longer urged by any differential pressure.

Accordingly, as compared with the prior art practice in which a high load, to which the spring is charged, is chosen in consideration of the differential pressure which urges the sleeve and the valve element forward, the load to which the spring must be charged can be reduced, allowing the use of a solenoid which is reduced in size and weight as well as a heating value involved and which is thus of a reduced cost in comparison to the prior art.

According to a second aspect of the invention, there is provided an automatic brake booster of the same type as mentioned above, but in which the effective diameter of the seal member is chosen to be larger than the effective diameter of the second valve seat and less than the effective diameter of the rolling part of the valve element.

According to the second aspect of the invention, no differential pressure acts on the sleeve in the inoperative condition of the booster where the valve element is seated on the second valve seat formed on the sleeve and is removed from the first valve seat formed on the valve body. As a consequence, in comparison to the prior art practice as mentioned above, the load to which the spring must be charged can be reduced by an amount corresponding to the differential pressure acting on the sleeve. This again allows the use of a solenoid which is reduced in size, weight, heating value involved and cost in comparison to the prior art.

Above and other objects, features and advantages of the invention will become apparent from the following description of several embodiments thereof with reference to the drawings.

DETAILED DESCRIPTION OF THE EMBODIMENTS

Figure 1:
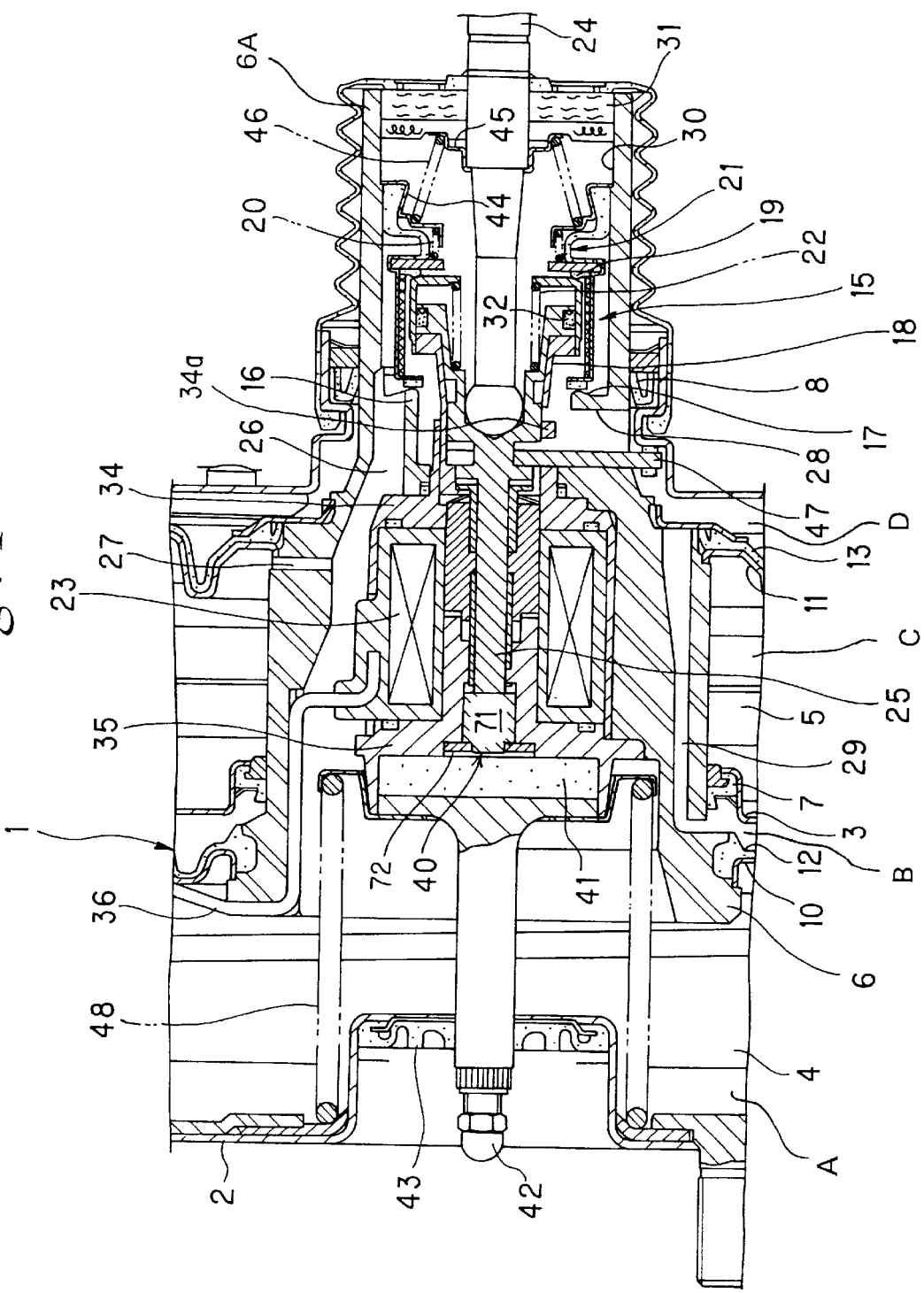
FIG. 1 is a cross section of one embodiment of the invention.

Referring to the drawings, several embodiments of the invention will now be described. In FIG. 1, a brake booster of tandem type 1 includes a shell 2, the interior of which is partitioned into a front chamber 4 and a rear chamber 5, which are defined across a centerplate 3. A tubular valve body 6 slidably extends through a rear portion of the shell 2 and the centerplate 3 with seal means 7 and 8 which maintain a hermetic seal thereat.

A front power piston 10 and a rear power piston 11 are connected to the outer periphery of the valve body 6 at positions which are located within the front chamber 4 and the rear chamber 5, respectively, and a front diaphragm 12 and a rear diaphragm 13 are applied to the back surfaces of the respective power pistons 10 and 11. In this manner, a constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

A valve mechanism 15 which switches a communication between the constant pressure chambers A, C and the variable chambers B, D is disposed within the valve body 6.

The valve mechanism 15 comprises a first valve seat 17 formed on the free end of an annular projection 16 of an increased diameter which extends rearward from the inner periphery of the valve body 6, a sleeve 18 slidably fitted into the valve body 6, a second valve seat 19 formed on the sleeve 18, a valve element 21 which is urged forward by a poppet return spring 20 and including a first seat area S1 and a second seat area S2 which are adapted to be seated upon the first and the second valve seat 17 and 19, respectively, a spring 22 which urges the sleeve 18 rearward to maintain the second valve seat 19 at an advanced position relative to the first valve seat 17, a solenoid 13 acting as drive means which displaces the sleeve 18 forwardly against the resilience of the spring 22, and a valve plunger 25 which is disposed to be displaceable relative to the valve body 6 and the sleeve 18 and which is coupled to an input shaft 24.

The valve mechanism 15 is formed with an axially extending constant pressure passage 26 formed in the valve body 6 to provide a communication between a space locate radially outward of the first valve seat 17 with the constant pressure chamber A, a radially extending constant pressure passage 27 which provides a communication between the constant pressure passage 26 and the constant pressure chamber C, a radially extending variable pressure passage 28 which provides a communication between a space located intermediate the second valve seat 19 and the first valve seat 17 with the variable pressure chamber B, an axially extending variable pressure passage 29 which provides a communication between the variable pressure chamber B and the variable pressure chamber D, and an atmosphere passage 30 formed in a terminal tubular portion 6A and providing a communication between a space located radially inward of the second valve seat 19 and the atmosphere. A filter 31 is disposed in the atmosphere passage 30. The constant pressure chamber A communicates with an intake manifold of an engine through a tubing, not shown, mounted on the shell 2 for introducing a negative pressure, whereby a negative pressure is normally introduced into the constant pressure chambers A and C.

An annular seal member 32 is disposed around the outer periphery of the valve plunger 25 around which the sleeve 18 is fitted, thus maintaining a hermetic seal between the inner peripheral surface of the sleeve 18 and the outer peripheral surface of the valve plunger 25.

The solenoid 23 is held sandwiched between a yoke 34 which is fitted into the valve body 6 and a holder 35, and is connected to an external controller, not shown, through a wiring 36 disposed along the inner wall of the shell 2.

Connected to the right end of the valve plunger 25 is a left end of the input shaft 24, the right end of which is connected to a brake pedal, not shown. A plate plunger 40 and a reaction disc 41 which are fitted into a portion 35a of an increased diameter of the holder 35 are sequentially disposed to the left of the valve plunger 25, and one end of an output shaft 42 is disposed in abutment against the left end face of the reaction disc 41. Said one end of the output shaft 42 is contained within the holder 35 while the distal end of the output shaft projects externally through an axial portion of the shell 2 with a seal member 43 interposed therebetween.

A retainer 44 is fixedly mounted within the terminal tubular portion 6A of the valve body 6, another retainer 45 is fitted around the input shaft 24, and a valve return spring 46 is disposed between the both retainers to urge the input shaft 24, its connected valve plunger 25, sleeve 18 and valve element 21 rearward.

Withdrawal of the valve plunger 25 from within the valve body 6 is prevented by the provision of a key member 47, which is well known in the art, the key member 47 abutting against the rear internal surface of the shell 2 to maintain the valve plunger 25 at an advanced position relative to the valve body 6 when the booster is inoperative.

A return spring 48 is disposed between the front internal wall of the shell 2 and the valve body 6 for normally maintaining the valve body 6 in its inoperative position shown.

In the present embodiment, as will be described later, the sleeve 18 comprises a driver portion 50 which is displaced forwardly by the solenoid 23, a valve seat portion 51 on which the second valve seat 19 is formed and adapted to be displaced forwardly by the valve plunger 25, an engaging portion 52 adapted to the engaged with the valve seat portion 51 to displace it forwardly as the driver portion 50 is displaced forwardly, and a Belleville spring 53 disposed between the driver portion 50 and the valve seat portion 51. The arrangement is such that the opening of the second valve seat 19 is reduced when the solenoid 23 is operated to provide an automatic brake action while the opening of the second valve seat 19 is increased during a normal brake operation, thus improving the operational response for a quick braking operation during a normal brake action without degrading the operational response for the automatic brake action.

In the present embodiment, the valve element 21 includes a rolling part 60 having an effective diameter which is chosen to be equal to the effective diameter of the seal member 32 and the effective diameter of the second valve seat 19 is chosen to be equal to or less than the effective diameter of the rolling part 60 or the seal member 32, as will be further discussed later, thus allowing the use of a solenoid 23 which provides a reduced magnetic force as compared with the prior art.

In addition, in the present embodiment, the plate plunger 40 comprises a first member 71 and a second member 72 which are disposed to be displaceable in a relative sense, as will be further discussed later, and capable of abutting against each other and against the reaction disc 41. By allowing part of a brake reaction which acts upon the first member 71 to be transmitted to the sleeve 18, it is made possible to control a braking output during an automatic brake operation without detracting from the maneuverability of a normal brake operation.

Figure 2:
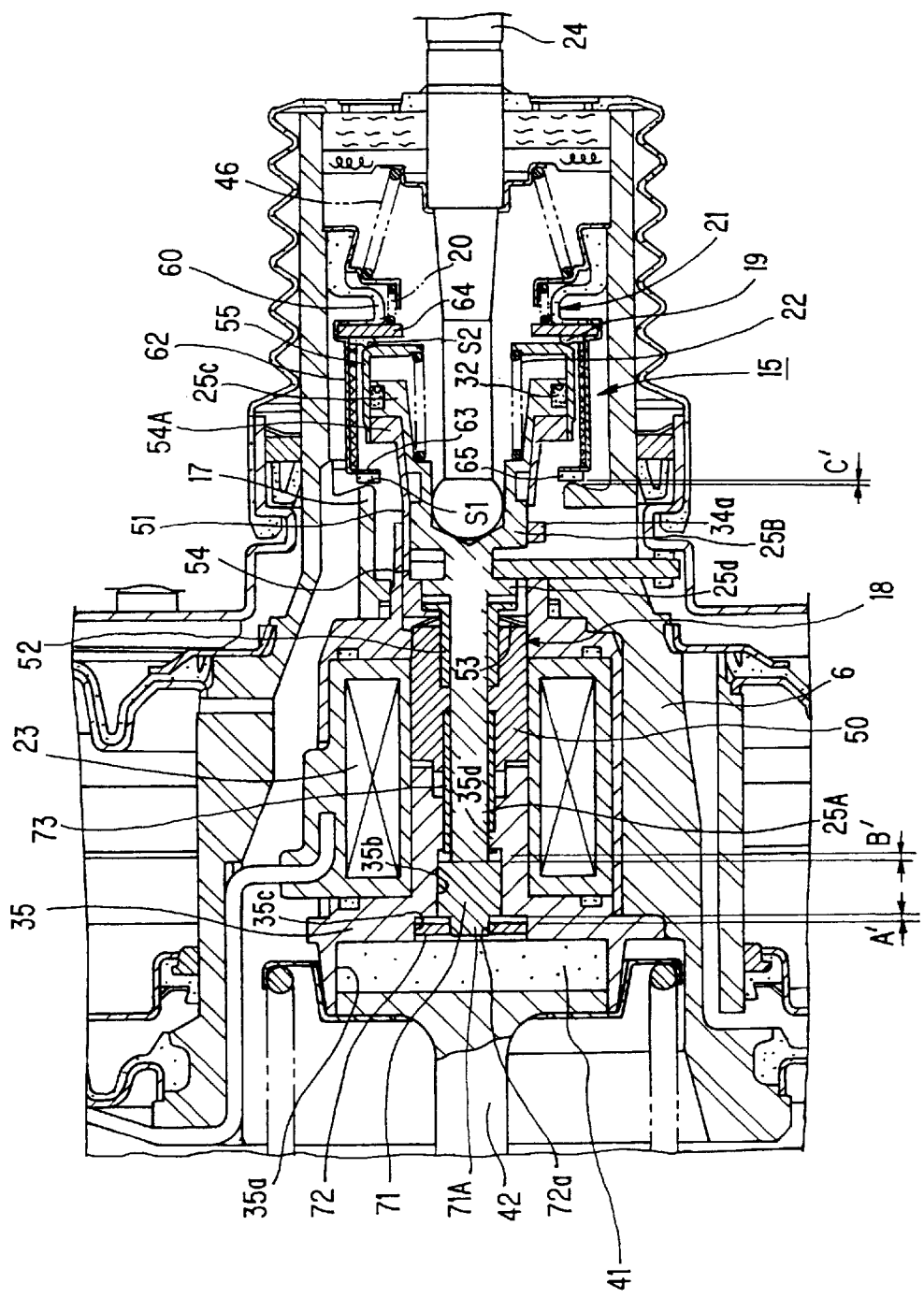
FIG. 2 is a cross section, to an enlarged scale, of an essential part shown in FIG. 1.

Specifically, as shown to an enlarged scale in FIG. 2, the sleeve 18 of the present embodiment comprises a driver portion 50 of a magnetizable material through which extends a portion 25A of a reduced diameter of the valve plunger 25, a valve seat portion 51 of non-magnetic material which is fitted around a body 25B of the valve plunger 25 and having a rear end which projects rearward beyond the first valve seat 17, an engaging portion 52 which extends into the valve seat portion 51 from a front side thereof and having its distal end being disposed as a press fit into the driver portion 50 and also including a terminal end which is then folded radially outward to engage with a stepped end face within the valve seat portion 51, and a Belleville spring 53 disposed between the driver portion 50 and the valve seat portion 51 and through which the engaging portion 52 extends. FIG. 2 shows an inoperative condition where the driver portion 50 and the valve seat portion 51 are spaced apart by the Belleville spring 53 and the valve seat portion 51 is engaged with the terminal end of the engaging portion 52.

The valve seat portion 51 includes a front tubular portion 54 which is fitted over the valve plunger 25 from a front side thereof and having a flange 54A at its front end which is engaged with a flange 25C of the valve plunger 25, and a rear tubular portion 55 which is fitted over the valve plunger 25 from a rear side thereof and having a terminal end which is connected to the flange 54A of the front tubular portion 54 and generally located rearward of the first valve seat 17. The rear tubular portion 55 is formed to the same diameter as the annular projection 16, and has its distal end folded radially inward to have the second valve seat 19 of the same diameter as the first valve seat 17 disposed on the outside of the folded end.

The spring 20 is disposed between the back surface of the rear tubular portion 55 and a step on the valve plunger 25, normally maintaining the flange 54A of the front tubular portion 54 in abutment against the flange 25C of the valve plunger 25 to maintain the sleeve 18 at an advanced position relative to the valve plunger 25.

It is to be noted that the holder 35 is inserted into the yoke 34 in a manner to avoid any clearance in the diametrical direction. The valve plunger 25 has its portion 25A of a reduced diameter slidably supported by a projection 35d around the inner periphery of the holder 35 and has its body 25B slidably supported by the inner periphery 34a of the yoke 34 at its rear end. The driver portion 50 includes a tubular portion 73 which is connected to the driver portion 50 and extends forwardly and which is slidably supported by the inner periphery of the holder 35 while the outer periphery of the body is sidably supported by the inner periphery of the yoke 34. In addition, the valve seat portion 51 is slidably supported around an intermediate portion 25d and the flange 25C of the valve plunger 25.

On the other hand, there is a clearance diametrically between the outer periphery of the valve plunger 25 and the inner periphery of the driver portion 50, between the valve seat portion 51 and the inner periphery of the yoke 34, and between the outer periphery of the engaging portion 52 and the inner periphery of the valve seat portion 51. In this manner, a smooth relative displacement is allowed between the valve plunger 25, the driver portion 50 and the valve seat portion 51 without causing any sticking therebetween.

In the present embodiment, the first valve seat 17 and the second valve seat 19 are disposed seriatim axially, as mentioned previously, and have an equal effective diameter. Specifically, the diameter of the second valve seat 19 is increased to achieve an identical diameter for the both valve seats 17 and 19 without reducing the diameter of the first valve seat 17.

On the other hand, the valve element 21 which is adapted to be seated on the first valve seat 17 and the second valve seat 19 which are disposed seriatim axially comprises a rolling part 60 formed of a resilient material and held sandwiched between the inner peripheral surface of the valve body 6 and the outer peripheral surface of the retainer 44 which is fitted into the valve body 6 at its one end, a backup plate 61 connected to the front end of the rolling part 60, a tubular portion 62 formed of a metal and crimped at its terminal end around the outer periphery of the backup plate 61 and extending forwardly in surrounding relationship with the second valve seat 19, and a backup plate 63 connected to the front end of the tubular portion 62 and folded radially inward. The second seat area S2 is formed by a seat area 64 defined on the front end face of the backup plate 61 while the first seat area S1 is formed by another seat area 65 defined on the front end face of the backup plate 63. The spacing between the first seat area S1 and the second seat area S2 is chosen to be slightly greater than the spacing between the first valve seat 17 and the second valve seat 19.

As a consequence, in the inoperative condition shown, the second seat area S2 is seated upon the second valve seat 19 while the first seat area S1 is removed from the first valve seat 17, whereby the negative pressure is introduced into the variable pressure chamber B, allowing the variable and constant pressure chambers A and B to assume an equal pressure. Under this condition, the differential pressure which acts on the sleeve 18 and the rolling part 60 of the valve element 21 as well as the resilience of the poppet return spring 20 which urges the valve element 21 forward are acting upon the valve plunger 25.

Figure 3:
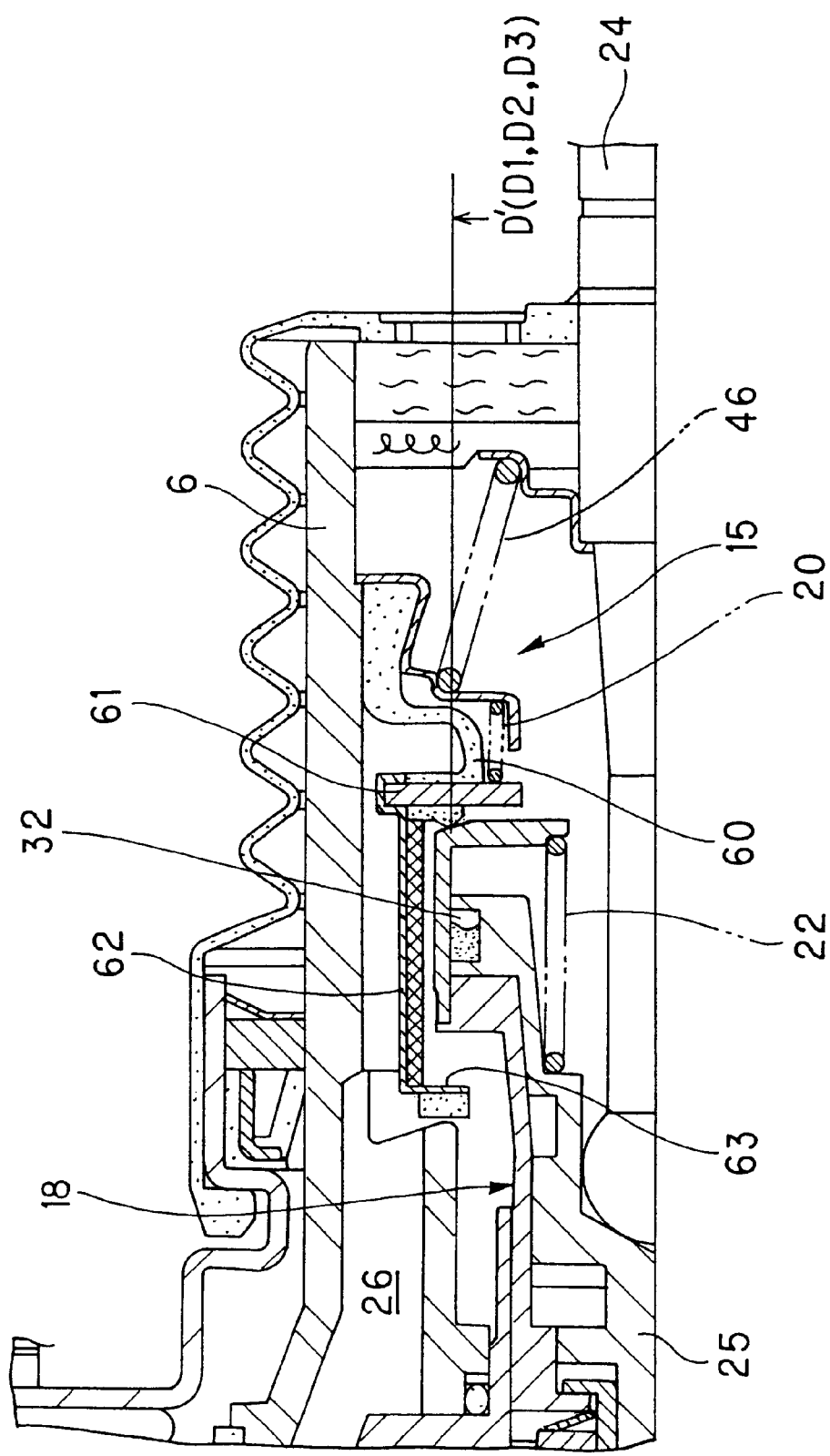
FIG. 3 is an enlarged cross section of a valve mechanism 15.

As illustrated in FIG. 3, the effective diameter D1 of the rolling part 20 which is folded radially outward, the effective diameter D3 of the seal member 32 and the effective diameter D2 of the second valve seat 19 are chosen to coincide with each other or coincide with a given effective diameter D.

It is to be noted that the effective diameter of the seal member 32 is substantially equal to the internal diameter of the sleeve 18.

As shown in FIG. 2, the plate plunger 40 of the present embodiment comprises a cylindrical first member 71 which is slidably fitted in the portion 35b of a reduced diameter of the holder 35 which forms part of the valve body 6, and a ring-shaped second member 72 which is slidably fitted into a portion 35c of an intermediate diameter of the holder 35. The first member 71 is centrally formed with a portion 71A of a reduced diameter which project forwardly through an opening 72a formed centrally in the second member 72, thus permitting the portion 71A of a reduced diameter and the second member 72, which are concentrically disposed, to abut against the rear end face of the reaction disc 41. When the booster is inoperative, the second member 72 is engaged with a step on the first member 71 to be spaced from the holder 35, thus defining a given clearance A with respect to the holder 35.

The driver portion 50 of the solenoid 23 is integrally formed with a tubular portion 73 of a reduced wall thickness which is slidably interposed between the portion 35a of a reduced diameter of the holder 35 and the valve plunger 25 and extending axially forward. The tubular portion 73 is spaced from the first member 71 to define a given clearance B between the tubular portion 73 and first member 71 when the booster is inoperative.

When the booster is inoperative, the driver portion 70 remains at rest at a position which is rearwardly retracted by a given spacing from the holder 35, and this spacing is chosen to be slightly greater than the clearance C of the first seat area S1 of the valve element 21 which is removed from the first valve seat 17.

In the present embodiment, in order to achieve a high servo ratio for the automatic brake, the values of the spacings A, B and C are chosen to satisfy the following inequality:

clearance A<(clearance B−clearance C)

With the described embodiment constructed in the manner mentioned above, in the inoperative condition of the booster where the second seat area S2 of the valve element 21 is seated on the second valve seat 19 formed on the sleeve 18 while the first seat area S1 of the valve element 21 is removed from the first valve seat 17 on the valve body 6, a differential pressure which urges the rolling part 60 forward is acting in a region thereof which is located radially inward of the effective diameter D, but at this time, a differential pressure which urges the rear backup plate 61 to which the distal end of the rolling part 60 is connected rearward is acting in a region thereof which is located radially inward of the effective diameter D, and is effective to cancel out the differential pressure which urges the rolling part 60 forward, whereby the valve element 21 is not urged by any differential pressure.

On the other hand, while the sleeve 18 would be subject to a differential pressure which urges it forward according to the prior art construction because a rear end face of the seal member 32 which is located radially outward of the effective diameter D2 would be subject to a negative pressure while the front end face would be subject to the atmosphere, in the present embodiment, both the rear end face and the front end face are subject to a negative pressure, and thus, the sleeve 18 cannot be urged by any differential pressure.

By contrast, in the operative condition of the booster where the first seat area S1 of the valve element 21 is seated on the first valve seat 17 formed on the valve body 6 while the second seat area S2 of the valve element is removed from the second valve seat 19 formed on the sleeve 18, the valve element 21 is not urged by any differential pressure in the operative condition in the similar manner as in the inoperative condition because the first valve seat 17 is formed to the same diameter as the first valve seat 19.

It is to be noted that as contrasted to the present embodiment mentioned above, in a conventional valve mechanism, the second valve seat has a greater effective diameter than a seal member, and a rolling part of a valve element has a greater effective diameter than the effective diameter of the second valve seat. Accordingly, in the inoperative condition of the booster where the valve element is seated on the second valve seat and is removed from the first valve seat, a differential pressure was acting upon the sleeve as well as the valve element which is seated upon the second valve seat formed on the sleeve. This necessitated that the resilience of the urging spring be determined in consideration of the differential pressure and the resilience of the poppet return spring, and accordingly, it has been difficult to allow a reduced magnetic force from the solenoid. However, according to the present embodiment, both the sleeve 18 and the valve element 21 are not urged as a result of any differential pressure, and hence, the resilience of the urging spring 22 may be determined in consideration of only the resilience of the poppet return spring 20, or more strictly also in consideration of the sliding resistance of the sleeve 18 and the valve element 21 or the sliding resistance of the sleeve 18 and the seal member 32. In this manner, the use of a solenoid 23 which is reduced in size and weight and which is thus more inexpensive than the prior art is permitted.

In the described embodiment, the effective diameter D1 of the rolling part 60, the effective diameter D3 of the seal member 32 and the effective diameter D2 of the second valve seat 19 are chosen to be equal to each other, but the invention is not limited to such choice. Alternatively, the effective diameter D2 of the second valve seat 19 may be chosen to be less than the other effective diameters D1 and D3. The valve element is then still free from an urging action of a differential pressure in the inoperative condition of the booster, thus achieving a similar function and effect.

In the described embodiment, the Belleville spring 53 disposed between the driver portion 50 which is forwardly disposed and formed of a magnetizable material and the valve seat portion 51 disposed rearwardly and formed of a non-magnetic material spaces the both portions apart. Accordingly, during a normal brake operation in which a brake pedal is depressed to drive the input shaft 24, the valve plunger 25 and the sleeve 18 forward, the driver portion 50 and the valve seat portion 51 are driven forward while maintaining the condition shown until the driver portion 50 abuts against the holder 35, whereupon the valve seat portion 51 compresses the Belleville spring 53 to be advanced relative to the driver portion 50. Accordingly, during a normal brake operation, the second valve seat 19 will be driven forward through an increased stroke relative to the first valve seat 17, thus increasing the opening between the second valve seat 19 and the valve element 21.

By contrast, during an automatic brake operation where the solenoid 23 is energized, the valve seat portion 51 is integrally driven forward in ganged relationship with the driver portion 50 while maintaining the condition shown, and after the driver portion 50 abuts against the holder 35, the valve seat portion 51 comes to a stop as spaced from the driver portion 50 by the Belleville spring 53. Accordingly, during an automatic brake operation, the second valve seat 19 will be driven forward through a reduced stroke relative to the first valve seat 17, thus reducing the opening of the second valve seat 19.

In contrast to the embodiment described above, a conventional valve mechanism is constructed such that the opening of the second valve seat remains unchanged between a normal brake operation and an automatic brake operation, and accordingly, a small spacing (or solenoid gap) is chosen between the driver portion and the holder in consideration of the operational response of the automatic brake. As a consequence, the opening of the second valve seat has been relatively small in the prior art construction. This resulted in a disadvantage that the operational response for a quick braking operation during the normal depression is degraded. However, in accordance with the present embodiment, the opening of the second valve seat 19 is reduced during an automatic brake operation and is increased during a normal brake operation. In this manner, the operational response for a quick braking operation during the normal braking operation can be improved without detracting from the operational response during the automatic brake operation.

Figure 4:
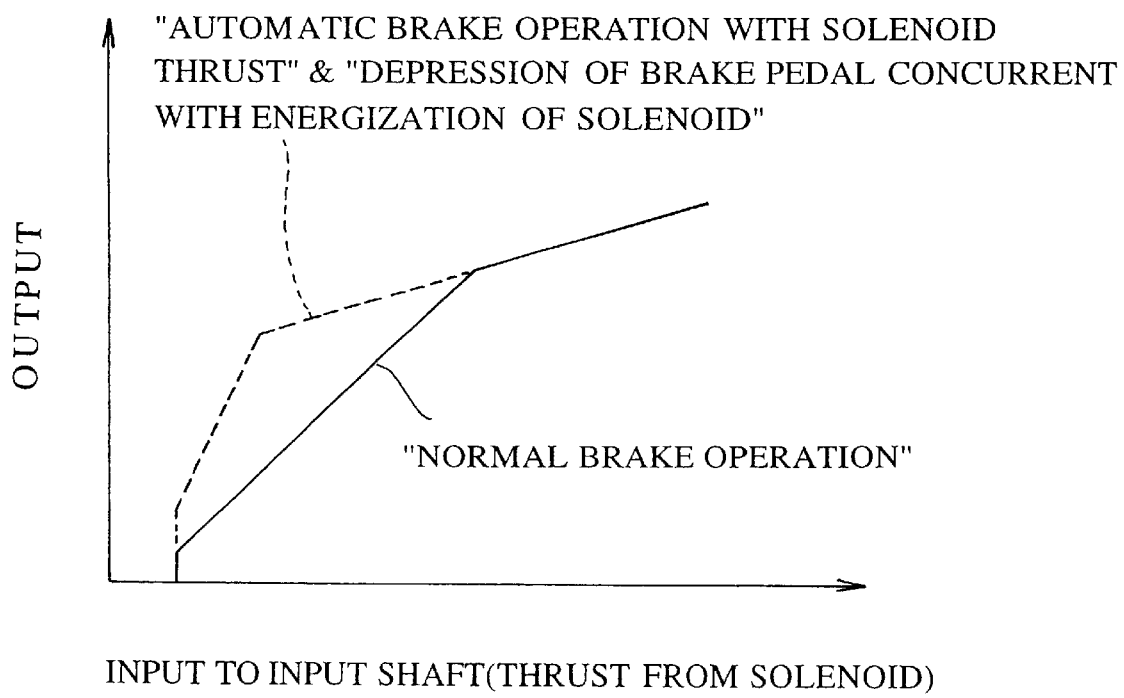
FIG. 4 graphically shows a characteristic diagram of the invention.

As a result of the described construction of the present embodiment, during the normal brake operation in which a brake pedal is depressed to drive the valve plunger 25, the sleeve 18, the first member 71 and its engaged second member 72 forward, an output increases rapidly ("jumping") without an increase in the reaction until the valve body 6 and the power pistons 10, 11 are driven forward to compress the reaction disc 41 between the holder 35 and the output shaft 42 to cause its deformation by bulging rearward to bring about an abutment of the portion 72A of a reduced diameter (first member 72) against the second member 72, as shown by a solid line in FIG. 4. After the reaction disc 41 abuts against the reduced diameter portion 71A of the first member 71 and the second member 72, a reaction which is acting upon both of these members is transmitted to a driver through the valve plunger 25 and the input shaft 24. Accordingly, the driver can control a brake output in the similar manner as experienced when operating a conventional brake booster.

On the other hand, during the automatic brake operation where the solenoid 23 is energized, the driver portion 50, the valve seat portion 51 and the tubular portion 73 are integrally driven forward while maintaining the condition shown until an abutment against the holder 35 occurs, thus opening the second valve seat 19 and allowing the differential pressure to act upon the valve body 6 and the power pistons 10, 11 to cause them to be driven forward. It then follows that a brake output rapidly increases ("jumping") without transmitting any brake reaction in the similar manner as during a normal brake operation, as shown in broken lines in FIG. 4, until the reaction disc 41 which is compressed between the holder 35 and the output shaft 42 deforms, by being bulged rearwardly, to abut against the reduced diameter portion 71A and the second member 72. Subsequently, after the reaction disc 41 abuts against the reduced diameter portion 71A of the first member 71 and the second member 72 to cause both these members, the valve plunger 25 and the input shaft 24 to retract relative to the valve body 6 (in practice, the valve body 6 is driven forward in a relative sense), the output continues to increase rapidly without transmitting any brake reaction until the first member 71 abuts against the tubular portion 73.

The second member 72 which retracts as a result of its engagement with the first member 71 eventually ceases to retract by abutment against a step on the holder 35, consuming the clearance A, but the first member 71 continues to retract subsequently, and abuts against the tubular portion 73 which remains at rest at its advanced position relative to the valve body 6 after consuming the clearance B or specifically the clearance B-clearance C. Thereupon, a brake reaction which is acting upon the small diameter portion 71A of the first member 71 begins to be transmitted to the driver portion 50, whereby the brake output which has been rapidly increasing rises subsequently at a given servo ratio, reaching a servo balance condition where the brake reaction is balanced with a thrust from the solenoid 23. Accordingly, by changing the magnetic force from the solenoid 23 to vary the thrust of the driver portion 50, it is possible to control a brake output during the automatic brake operation against the reaction which is acting upon the first member 71.

At this time, only the brake reaction which is acting upon the small diameter portion 71A is transmitted to the driver portion 50, whereby a small change in the thrust of the driver portion 50 is effective to produce a larger change in the brake output.

In contrast to the described embodiment, a conventional automatic brake booster is constructed to prevent the transmission of a reaction to the sleeve. Accordingly, during the automatic brae operation, the second valve seat will be uniformly fully open and cannot exercise a control over the brake output, resulting an excessive brake output in a low speed region. However, with the present embodiment, a small solenoid 23 which exhibits a reduced magnetic force can change the magnetic force, allowing a smooth control over the brake output.

It will be seen that it is possible to establish a greater servo ration than a normal depression when a driver depresses a brake pedal simultaneously with the energization of the solenoid 23, as shown in FIG. 4, by suitably designing an area of the small diameter portion 71A of the first member 71. In such instance, a greater jumping response than available during a normal brake operation may be utilized in combination, achieving a very excellent operational response.

Figure 5:
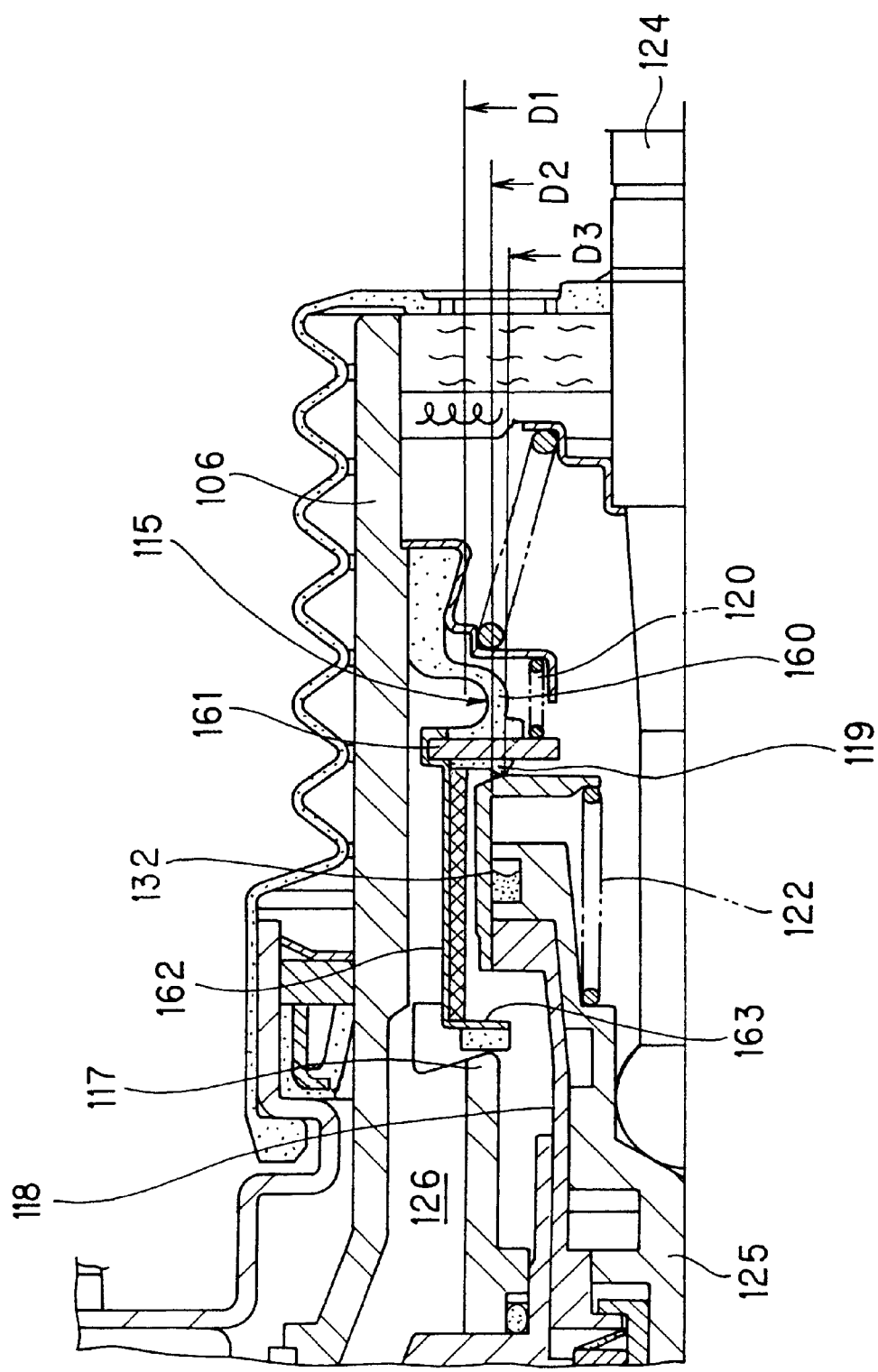
FIG. 5 is an enlarged cross section of a valve mechanism 115 of another embodiment of the invention.

FIG. 5 shows another embodiment of the invention. In the first embodiment, the effective diameter D1 of the rolling part 60, the effective diameter D3 of the seal member 32 and the effective diameter D2 of the second valve seat 19 have been chosen to be equal to each other. However, in the present embodiment, the effective diameter D2 of a seal member 132 is chosen to be greater than the effective diameter D3 of a second valve seat 119 and less than the effective diameter D1 of a rolling part 160 of a valve element 121.

In other respects, the arrangement is similar to the first embodiment, and accordingly, parts corresponding to those shown in the first embodiment are designated by like numerals as used before, to which "100" is added.

According to this embodiment, in an inoperative condition of the booster when a second seat area S2 of a valve element 121 is seated on a second valve seat 119 formed on a sleeve 118 while a first seat area S1 of the valve element is removed from a first valve seat 117 formed on a valve body 106, a differential pressure acts upon part of the rolling part 160 which is located between the effective diameter D1 and the effective diameter D2 to urge it forward. Thus, the differential pressure acts only upon the rolling part 160, but does not act upon the sleeve 118.

While a differential pressure acts also upon part of the rolling part 160 which is located between the effective diameter D2 and the effective diameter D1 to urge it forward, there is an equivalent action upon part of the sleeve 118 which is located between the effective diameter D2 and the effective diameter D1 to urge it rearward, and accordingly it follows that there is no differential action acting upon such part of the rolling part 160.

On the other hand, in the operative condition of the booster when the first seat area S1 of the valve element 121 is seated on the first valve seat 117 formed on the valve body 106 while the second seat area S2 is removed from the second valve seat 119 formed on the sleeve 118, there is a differential pressure which acts upon part of the rolling part 160 located between the effective diameter D3 and the effective diameter D2 to urge it forward, but an equivalent differential pressure acts upon part of a backup plate 161 which is located between the effective diameter D3 and the effective diameter D2 to urge it rearward, and accordingly, no differential pressure is substantially acting upon such part of the rolling part 160.

It will be seen that there is a differential pressure acting upon part of a front backup plate 163 which is located between the effective diameter D3 and the effective diameter D2 to urge it forward.

In contrast to the second embodiment described above, a conventional valve mechanism is constructed such that a second valve seat has a greater effective diameter than the effective diameter of a seal ring and a rolling part of a valve element has a greater effective diameter than the effective diameter of the second valve seat, and accordingly, in the inoperative condition of a booster where the valve element is seated on the second valve seat and is removed from the first valve seat, there is a differential pressure acting upon the sleeve to urge it forward and there is also a differential pressure upon the valve element which is seated on the second valve seat formed on the sleeve to urge it forward. Accordingly, a loaded to which a spring, which is effective to maintain the sleeve at an advanced position relative to a valve plunger in the inoperative condition of a booster, is charged must be chosen to be greater than a sum of the differential pressure acting upon the sleeve and the valve element and the resilience of the poppet return spring. Hence, the magnetic force from the solenoid must be established large enough to overcome the resilience of the spring in order to drive the sleeve forwardly. By contrast, with the second embodiment, the sleeve 118 is not urged by any differential pressure in the inoperative condition, and hence the load to which the urging spring 122 must be charged can be reduced by an amount corresponding to the differential pressure which has been acting upon the sleeve 118, thus allowing the use of a solenoid of a reduced magnetic force as compared with the prior art.

In both the first and the second embodiment, the first valve seat 17 or 117 and the second valve seat 19 or 119 have been constructed in the similar manner, but the invention is not limited to such choice, but the second valve seat 19 or 119 may be disposed inwardly of the first valve seat 17 or 117 in the similar manner as in the prior art.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. In an automatic brake booster including a valve body slidably disposed within a shell, a power piston mounted on the valve body, constant and variable pressure chambers defined across the power piston and a valve mechanism disposed within the valve body for switchingly controlling a flow path therein; the valve mechanism comprising a first valve seat formed on the valve body and facing rearward, a sleeve slidably fitted into the valve body and urged rearward by a spring, a second valve seat formed on the sleeve and facing rearward, a valve element urged forward by a poppet return spring to be seated on the first and the second valve seats, drive means for displacing the sleeve forward to switch the flow path, a valve plunger slidably disposed in the sleeve and coupled to an input shaft for driving the sleeve forward as the input shaft is driven forward to switch the flow path, and a seal member interposed between the sleeve and the valve plunger to maintain a hermetic seal therebetween; the valve element comprising a rolling part located at a rear portion thereof and which is folded radially outward to be connected to the valve body, and first and second seat areas disposed forwardly of the rolling part and adapted to be seated on the first and the second valve seats, respectively;

comprising the improvement wherein the effective diameter of the rolling part of the valve element and the effective diameter of the seal member are chosen to be equal to each other and the effective diameter of the second valve seat is chosen to be equal to or less than the effective diameter of the seal member.

2. An automatic brake booster according to claim 1 in which the second valve seat is disposed rearward of the first valve seat so that the first and second valve seats are disposed seriatim axially, the second seat area of the valve element which is adapted to be seated on the second valve seat being disposed rearward of the first seat area which is adapted to be seated on the first valve seat, and the first and second valve seats being chosen to have an equal effective diameter.

3. An automatic brake booster according to claim 1 in which the valve element comprises a backup plate which supports the forwardly located first seat area, another backup plate which supports the rearwardly located second seat area, and a tubular portion having sufficient rigidity to connect between the outer peripheries of both backup plates, the rearwardly located backup plate being connected to the valve body through the rolling part which is folded radially outward and formed of a resilient material.

4. An automatic brake booster according to claim 1 in which the drive means comprises a solenoid.

5. In an automatic brake booster including a valve body slidably disposed within a shell, a power piston mounted on the valve body, constant and variable pressure chambers defined across the power piston and a valve mechanism disposed within the valve body for switchingly controlling a flow path therein; the valve mechanism comprising a first valve seat formed on the valve body and facing rearward, a sleeve slidably fitted into the valve body and urged rearward by a spring, a second valve seat formed on the sleeve and facing rearward, a valve element urged forward by a poppet return spring to be seated on the first and the second valve seats, drive means for displacing the sleeve forward to switch the flow path, a valve plunger slidably disposed in the sleeve and coupled to an input shaft for driving the sleeve forward as the input shaft is driven forward to switch the flow path, and a seal member interposed between the sleeve and the valve plunger to maintain a hermetic seal therebetween; the valve element comprising a rolling part located at a rear portion thereof and which is folded radially outward to be connected to the valve body, and first and second seat areas disposed forwardly of the rolling part and adapted to be seated on the first and second valve seats, respectively;

comprising the improvement wherein the effective diameter of the seal member is chosen to be greater than the effective diameter of the second valve seat and less than the effective diameter of the rolling part of the valve element.

6. An automatic brake booster according to claim 5 in which the second valve seat is disposed rearward of the first valve seat so that the first and second valve seats are disposed seriatim axially, the second seat area of the valve element which is adapted to be seated on the second valve seat being disposed rearward of the first seat area which is adapted to be seated on the first valve seat, and the first and second valve seats being chosen to have an equal effective diameter.

7. An automatic brake booster according to claim 5 in which the valve element comprises a backup plate which supports the forwardly located first seat area, another backup plate which supports the rearwardly located second seat area, and a tubular portion having sufficient rigidity to connect between the outer peripheries of both backup plates, the rearwardly located backup plate being connected to the valve body through the rolling part which is folded radially outward and formed of a resilient material.

8. An automatic brake booster according to claim 5 in which the drive means comprises a solenoid.

* * * * *